US008186098B1

(12) United States Patent
Wilson

(10) Patent No.: US 8,186,098 B1
(45) Date of Patent: May 29, 2012

(54) BETTER MOUSE TRAP SYSTEM

(76) Inventor: Russell L. Wilson, Tarpon Springs, FL (US)

( * ) Notice: Subject to any disclaimer, the term of this patent is extended or adjusted under 35 U.S.C. 154(b) by 405 days.

(21) Appl. No.: 12/583,119

(22) Filed: Aug. 14, 2009

(51) Int. Cl.
*A01M 23/04* (2006.01)

(52) U.S. Cl. ............ 43/69; 43/64; 43/70; 43/71; 43/72; 43/74; 119/751; 119/752

(58) Field of Classification Search ............... 43/64, 69, 43/70, 71, 72, 74; 119/751, 752
See application file for complete search history.

(56) References Cited

U.S. PATENT DOCUMENTS

| | | | | |
|---|---|---|---|---|
| 2,374,691 A * | 5/1945 | Middleton | ......................... | 43/69 |
| 3,423,870 A * | 1/1969 | Kost | ................................. | 43/69 |
| 3,791,065 A * | 2/1974 | Snow | ................................. | 43/69 |
| 4,241,531 A * | 12/1980 | Nelson et al. | ..................... | 43/69 |
| 4,706,407 A * | 11/1987 | Melton | ............................ | 43/69 |
| 6,557,295 B1 * | 5/2003 | Alonso | ............................. | 43/69 |
| 6,938,368 B2 * | 9/2005 | Guidry | ............................. | 43/69 |
| 6,990,767 B1 * | 1/2006 | Margalit | .......................... | 43/61 |
| 2006/0026893 A1 * | 2/2006 | Sears | ............................... | 43/69 |

* cited by examiner

*Primary Examiner* — Joshua J Michener
*Assistant Examiner* — Justin Benedik

(57) ABSTRACT

An upper bucket has a closed top, an open bottom and a side wall. A lower opening is cut into the side wall of the upper bucket. The lower opening has a lower slit at a lower extent of the side wall. The lower opening has an arcuate slit. The slit extends upwardly from the lower slit. A flat, generally circular plate has laterally extending pivot pins. Pivot apertures extend through the upper bucket at diametrically opposed locations adjacent to the lower slot. The pivot apertures rotatably receive the pivot pins for effecting movement of the plate between a horizontal orientation and a pivoted orientation.

1 Claim, 4 Drawing Sheets

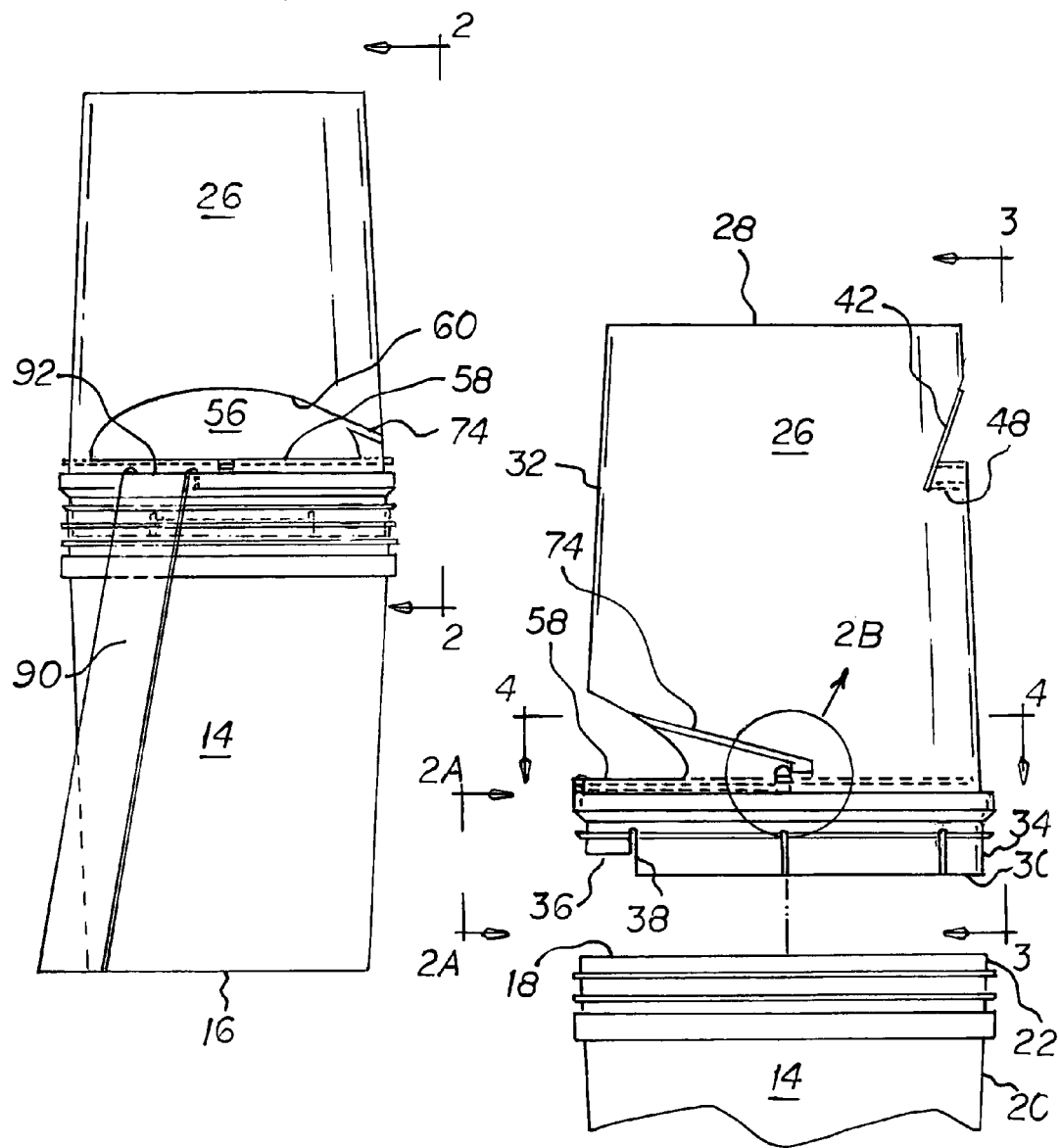

FIG 2A
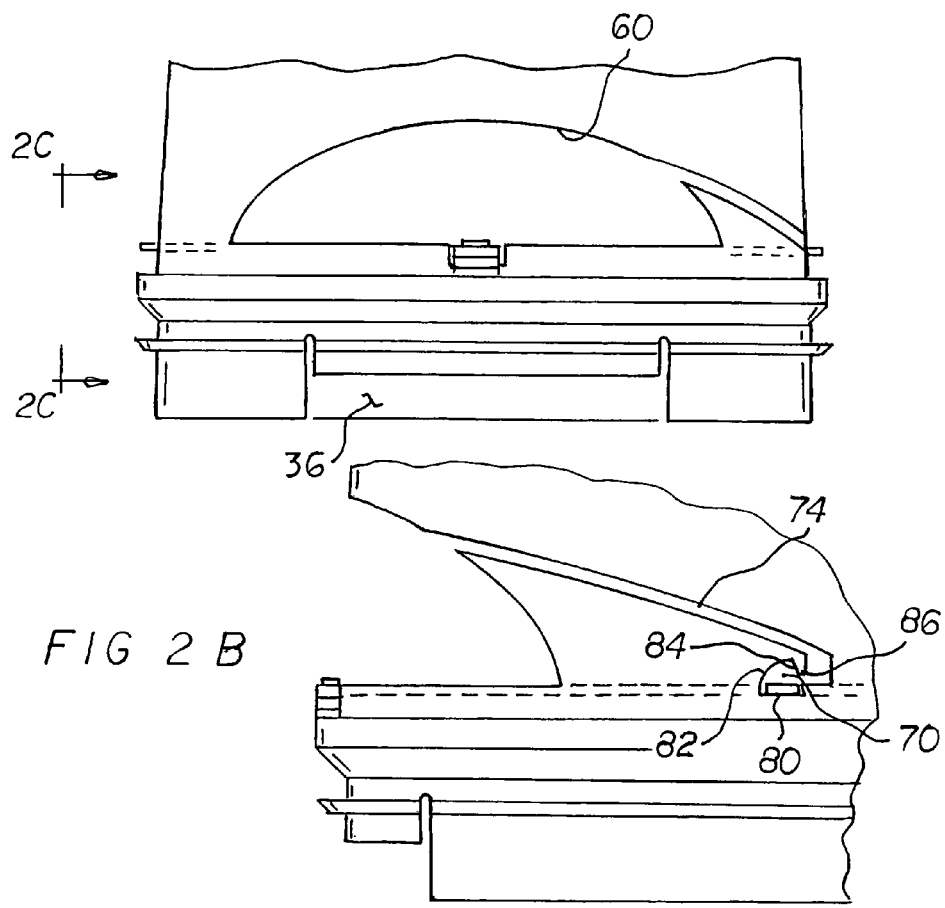
FIG 2B
FIG 2C
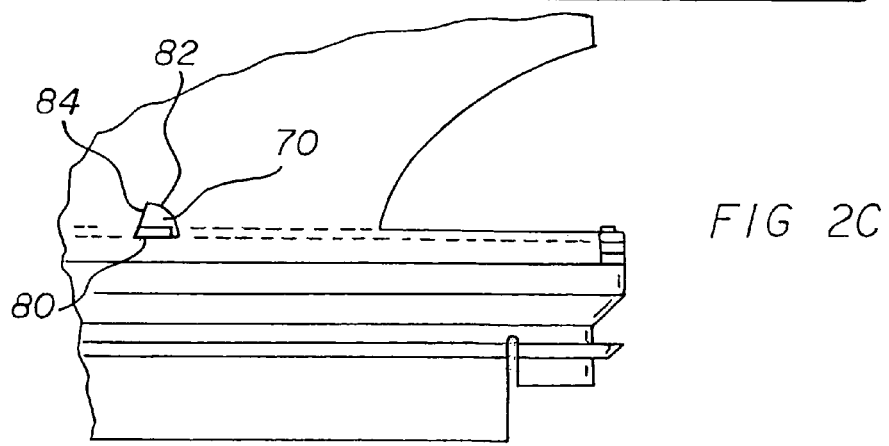

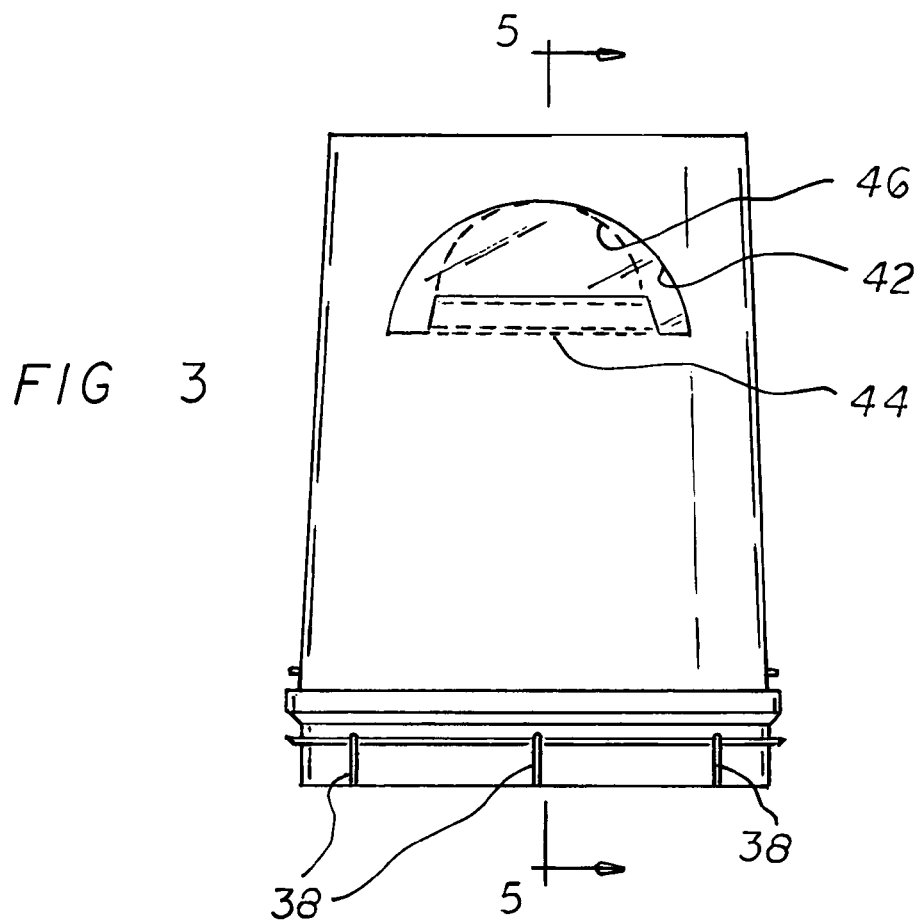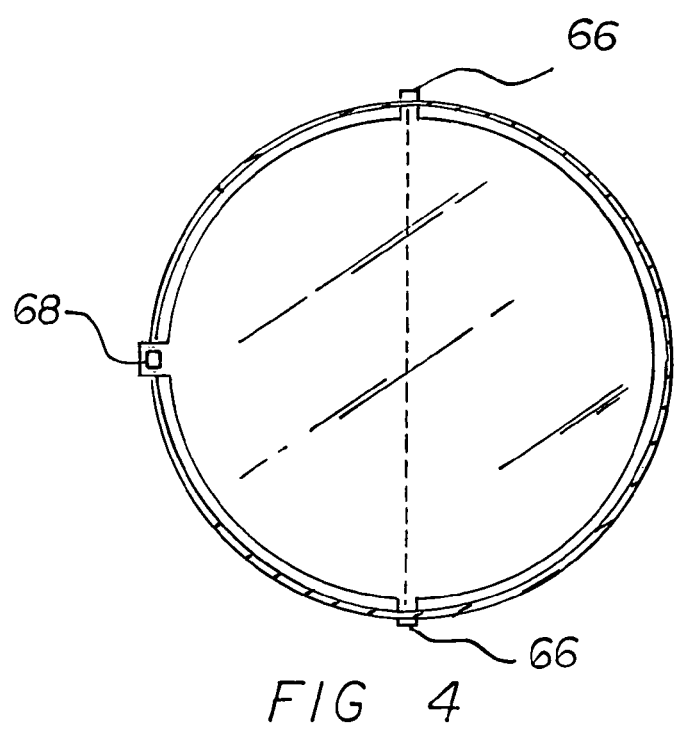

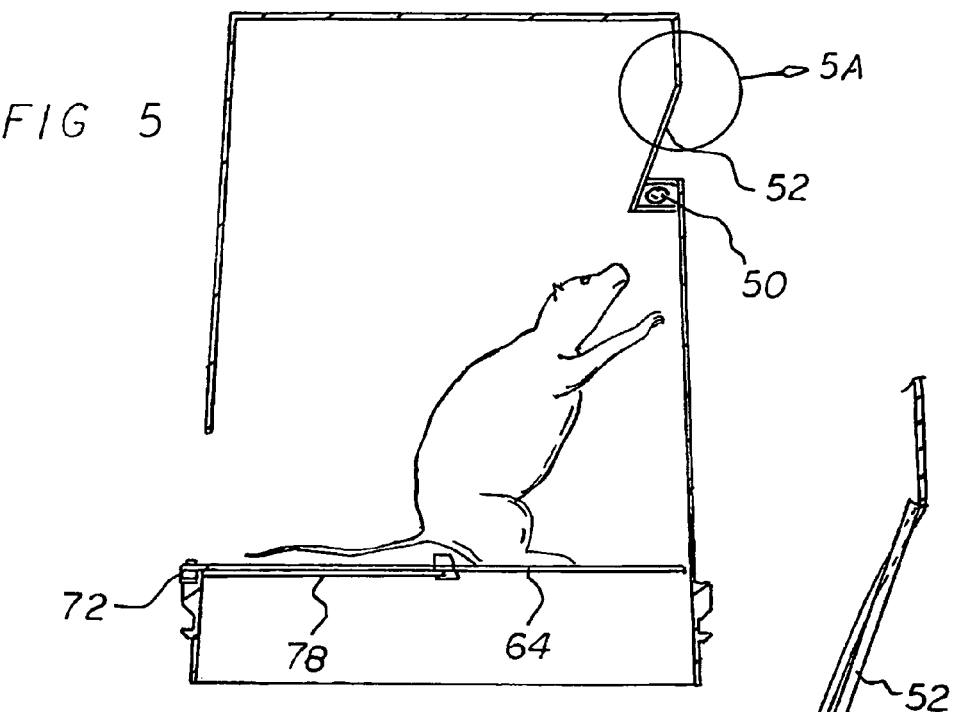
FIG 5
FIG 5A
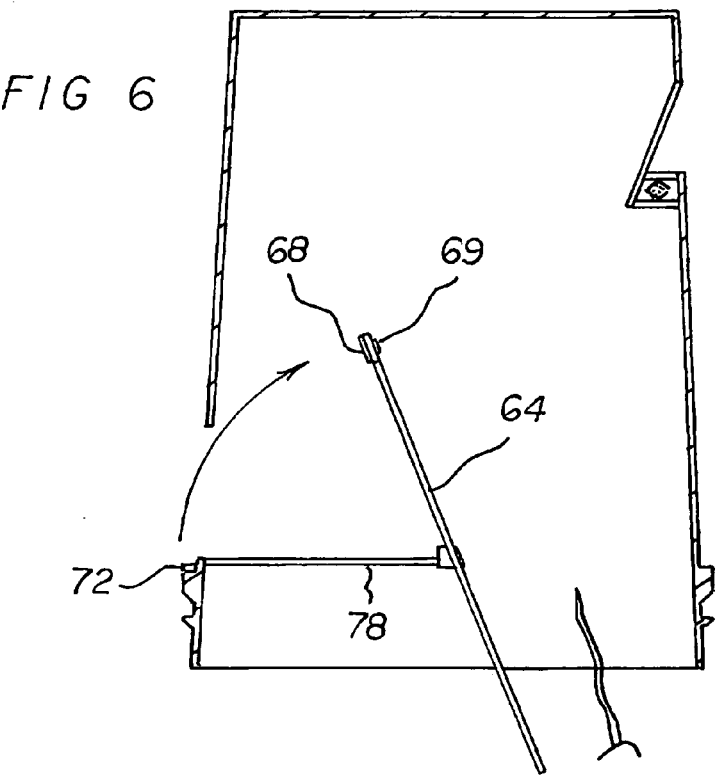
FIG 6

BETTER MOUSE TRAP SYSTEM

BACKGROUND OF THE INVENTION

1. Field of the Invention

The present invention relates to a better mouse trap system and more particularly pertains to capturing, retaining and destroying mice and other undesirable animals and for releasing desirable animals, the capturing, retaining, and destroying and releasing being done in a safe, convenient and reliable manner.

2. Description of the Prior Art

The use of animal traps of known designs and configurations is known in the prior art. More specifically, animal traps of known designs and configurations previously devised and utilized for the purpose of trapping animals through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,748,766 issued Jun. 7, 1988 to Stimac relates to an Animal Trap and U.S. Pat. No. 6,016,623 issued Jan. 25, 2000, to Celestine relates to a Rodent Trap.

While these devices fulfill their respective, particular objectives and requirements, the aforementioned patents do not describe a better mouse trap system that allows for capturing, retaining and destroying mice and other undesirable animals and for releasing desirable animals, the capturing, retaining, and destroying and releasing being done in a safe, convenient and reliable manner.

In this respect, the better mouse trap system according to the present invention substantially departs from the conventional concepts and designs of the prior art, and in doing so provides an apparatus primarily developed for the purpose of capturing, retaining and destroying mice and other undesirable animals and for releasing desirable animals, the capturing, retaining, and destroying and releasing being done in a safe, convenient and reliable manner.

Therefore, it can be appreciated that there exists a continuing need for a new and improved better mouse trap system which can be used for capturing, retaining and destroying mice and other undesirable animals and for releasing desirable animals, the capturing, retaining, and destroying and releasing being done in a safe, convenient and reliable manner. In this regard, the present invention substantially fulfills this need.

SUMMARY OF THE INVENTION

In view of the foregoing disadvantages inherent in the known types of animal traps of known designs and configurations now present in the prior art, the present invention provides an improved better mouse trap system. As such, the general purpose of the present invention, which will be described subsequently in greater detail, is to provide a new and improved better mouse trap system and method which has all the advantages of the prior art and none of the disadvantages.

To attain this, the present invention essentially comprises a better mouse trap system. First utilized is a lower bucket. The lower bucket has a closed bottom. The bottom is in a circular configuration. The lower bucket has an open top. The open top is in a circular configuration. The bottom and the top are separated by a height. The lower bucket has a frusto-conical side wall. The side wall is provided between the top and the bottom. The bottom is smaller than the top. The side wall terminating above. The lower bucket has a cylindrical lip. The lip is provided at the termination of the side wall. The lower bucket is essentially rigid. The lower bucket is fabricated of a plastic or metal material.

An upper bucket is provided. The upper bucket has a closed top. The top is in a circular configuration. The upper bucket has an open bottom. The bottom is in a circular configuration. The bottom and the top are separated by a height. The upper bucket has a frusto-conical side wall. The side wall is provided between the top and the bottom. The top is smaller than the bottom. The side wall terminates below. The upper bucket has an angled cylindrical lip. The lip is provided at the termination of the side wall. The upper bucket is essentially rigid. The upper bucket is fabricated of a plastic material. The upper bucket has a front. The front of the upper bucket has an arcuate cut-out. The cut-out extends upwardly from the bottom. The upper bucket has vertical slots. The vertical slots extend upwardly from the cut-out. The cut-out and slots facilitate the releasable coupling of the upper bucket onto the lower bucket.

Provided next is an upper opening. The upper opening is cut into an upper extent of the side wall of the upper bucket. The upper opening has a horizontal upper slit. The upper slit extends circumferentially for about 120 degrees, plus or minus 10 percent, of the side wall diametrically opposed to the arcuate cut-out. The upper opening has an arcuate upper slit. The slit extends upwardly from the upper slit to a height of between 15 and 25 percent of the height of the upper bucket. Horizontal shelving is provided. The horizontal shelving is provided at the upper slit. Bait, not normally provided, is utilized. The horizontal shelving supports the bait. A transparent sheet is provided. The transparent sheet is removably coupled to the upper opening.

A lower opening is provided. The lower opening is cut into the side wall of the upper bucket. The lower opening has a horizontal lower slit. The lower slit extends circumferentially for about 160 degrees, plus or minus 10 percent, at a lower extent of the side wall above the cut-out. The lower opening has an arcuate upper slit. The upper slit extends upwardly from the lower slit to a height of between 20 and 30 percent of the height of the upper bucket.

A flat, generally circular plate is provided next. The plate has laterally extending pivot pins. The plate has a forwardly extending upper magnet. The plate has pivot apertures. The pivot apertures extend through the upper bucket at diametrically opposed locations adjacent to the lower slit. The pivot apertures rotatably receive the pivot pins for effecting movement of the plate between a horizontal orientation and a pivoted orientation. The horizontal orientation separates a retaining space in the lower bucket from a capturing space in the upper bucket. Note FIG. 5. The pivoted orientation causes an animal on the plate remote from the lower opening to fall into the lower bucket. Note FIG. 6. The plate has a lower metal strip. The lower metal strip is secured to the upper bucket adjacent to a central extent of the lower slit. The lower metal strip receives and retains the upper magnet and plate in the horizontal orientation until an animal is upon the plate remote from the lower opening. The upper bucket has a transverse opening. The transverse opening is between the lower opening and one of the pivot apertures. In this manner the plate may be added to and removed from the system.

Further provided is a semicircular platelet. The platelet is secured to the upper bucket adjacent to the lower slit and beneath half of the plate when in the horizontal orientation. Each of the pivot apertures in the side wall of the upper bucket have a lower horizontal face. In this manner the plate is supported in a horizontal orientation. Each pivot aperture has an arcuate face. In this manner pivoting of the plate is allowed. Each pivot aperture has a radial face. In this manner pivoting of the place is limited. One pivot aperture has a vertical finger. In this manner an animal within the lower bucket is precluded from moving the plate from a horizontal orientation. The plate and platelet are fabricated of a rigid transparent material.

Provided last is a ramp. The ramp is fabricated of a rigid material. The ramp has an upper end. The upper end is removably coupled to the upper bucket at the lower opening. In this manner animals are allowed to enter the upper bucket.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved better mouse trap system which has all of the advantages of the prior art animal traps of known designs and configurations and none of the disadvantages.

It is another object of the present invention to provide a new and improved better mouse trap system which may be easily and efficiently manufactured and marketed.

It is further object of the present invention to provide a new and improved better mouse trap system which is of durable and reliable constructions.

An even further object of the present invention is to provide a new and improved better mouse trap system which is susceptible of a low cost of manufacture with regard to both materials and labor, and which accordingly is then susceptible of low prices of sale to the consuming public, thereby making such better mouse trap system economically available to the buying public.

Even still another object of the present invention is to provide a better mouse trap system for capturing, retaining and destroying mice and other undesirable animals and for releasing desirable animals, the capturing, retaining, and destroying and releasing being done in a safe, convenient and reliable manner.

Lastly, it is an object of the present invention to provide a new and improved better mouse trap system. An upper bucket has a closed top, an open bottom and a side wall. A lower opening is cut into the side wall of the upper bucket. The lower opening has a lower slit at a lower extent of the side wall. The lower opening has an arcuate slit. The slit extends upwardly from the lower slit. A flat, generally circular plate has laterally extending pivot pins. Pivot apertures extend through the upper bucket at diametrically opposed locations adjacent to the lower slot. The pivot apertures rotatably receive the pivot pins for effecting movement of the plate between a horizontal orientation and a pivoted orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a better mouse trap system constructed in accordance with the principles of the present invention.

FIG. 2 is an exploded side elevational view taken along line 2-2 of FIG. 1.

FIG. 2A is an enlarged front elevational view taken at the lower extent of the upper bucket.

FIG. 2B is a left side elevational view taken along line 2C-2C of FIG. 2A.

FIG. 2C is a right side elevational view opposite from FIG. 2B.

FIG. 3 is a rear elevational view of the upper bucket taken along line 3-3 of FIG. 2.

FIG. 4 is a cross sectional view taken along line 4-4 of FIG. 2.

FIG. 5 is a cross sectional view taken along line 5-5 of FIG. 3.

FIG. 5A is an enlarged showing taken at Circle 5 of FIG. 5A of FIG. 5

FIG. 6 is a cross sectional view similar to FIG. 5 but after capturing a mouse.

The same reference numerals refer to the same parts throughout the various Figures for the various embodiments of the invention.

DESCRIPTION OF THE PREFERRED EMBODIMENT

With reference now to the drawings, and in particular to FIG. 1 thereof, the preferred embodiment of the new and improved better mouse trap system embodying the principles and concepts of the present invention and generally designated by the reference numeral 10 will be described.

The present invention, the better mouse trap system 10 is comprised of a plurality of components. Such components in their broadest context include an upper bucket, a lower opening, a flat, generally circular plate. Such components are individually configured and correlated with respect to each other so as to attain the desired objective.

First utilized is a lower bucket 14. The lower bucket has a closed bottom 16. The bottom is in a circular configuration. The lower bucket has an open top 18. The open top is in a circular configuration. The bottom and the top are separated by a height. The lower bucket has a frusto-conical side wall 20. The side wall is provided between the top and the bottom.

The bottom is smaller than the top. The side wall terminating above. The lower bucket has a cylindrical lip 22. The lip is provided at the termination of the side wall. The lower bucket is essentially rigid. The lower bucket is fabricated of a plastic or metal material.

An upper bucket 26 is provided. The upper bucket has a closed top 28. The top is in a circular configuration. The upper bucket has an open bottom 30. The bottom is in a circular configuration. The bottom and the top are separated by a height. The upper bucket has a frusto-conical side wall 32. The side wall is provided between the top and the bottom. The top is smaller than the bottom. The side wall terminates below. The upper bucket has a cylindrical lip 34. The lip is provided at the termination of the side wall. The upper bucket is essentially rigid. The upper bucket is fabricated of a plastic material. The upper bucket has a front. The front of the upper bucket has an arcuate cut-out 36. The cut-out extends upwardly from the bottom. The upper bucket has vertical slots 38. The vertical slots extend upwardly from the cut-out. The cut-out and slots facilitate the releasable coupling of the upper bucket onto the lower bucket.

Provided next is an upper opening 42. The upper opening is cut into an upper extent of the side wall of the upper bucket. The upper opening has a horizontal upper slit 44. The upper slit extends circumferentially for about 120 degrees, plus or minus 10 percent, of the side wall diametrically opposed to the arcuate cut-out. The upper opening has an arcuate upper slit 46. The slit extends upwardly from the upper slit to a height of between 15 and 25 percent of the height of the upper bucket. Horizontal shelving 48 is provided. The horizontal shelving is provided at the upper slit. Bait 50 is utilized. The horizontal shelving supports the bait. A transparent sheet 52 is provided. The transparent sheet is removably coupled to the upper opening.

A lower opening 56 is provided. The lower opening is cut into the side wall of the upper bucket. The lower opening has a horizontal lower slit 58. The lower slit extends circumferentially for about 160 degrees, plus or minus 10 percent, at a lower extent of the side wall above the cut-out. The lower opening has an arcuate upper slit 60. The upper slit extends upwardly from the lower slit to a height of between 20 and 30 percent of the height of the upper bucket.

A flat, generally circular plate 64 is provided next. The plate has laterally extending pivot pins 66. The plate has forwardly extending upper magnets. In the preferred embodiment, the magnets include a larger lower magnet 68 on one side and a smaller upper magnet 69 on the other side. The system thus may be adapted for larger or smaller animals depending on the orientation of the circular plate in the system, right side up or up side down. The plate has pivot apertures 70. The pivot apertures extend through the upper bucket at diametrically opposed locations adjacent to the lower slit. The pivot apertures rotatably receive the pivot pins for effecting movement of the plate between a horizontal orientation and a pivoted orientation. The horizontal orientation separates a retaining space in the lower bucket from a capturing space in the upper bucket. Note FIG. 5. The pivoted orientation causes an animal on the plate remote from the lower opening to fall into the lower bucket. Note FIG. 6. The plate has a lower metal strip 72. The lower metal strip is secured to the upper bucket adjacent to a central extent of the lower slit. The lower metal strip receives and retains the upper magnet and plate in the horizontal orientation until an animal is upon the plate remote from the lower opening. The upper bucket has a transverse opening 74. The transverse opening is between the lower opening and one of the pivot apertures. In this manner the plate may be added to and removed from the system.

Further provided is a semicircular platelet 78. The platelet is secured to the upper bucket adjacent to the lower slit and beneath half of the plate when in the horizontal orientation. Each of the pivot apertures in the side wall of the upper bucket have a lower horizontal face 80. In this manner the plate is supported in a horizontal orientation. Each pivot aperture has an arcuate face 82. In this manner pivoting of the plate is allowed. Each pivot aperture has a radial face 84. In this manner pivoting of the place is limited. One pivot aperture has a vertical finger 86. In this manner an animal within the lower bucket is precluded from moving the plate from a horizontal orientation. The plate and platelet are fabricated of a rigid transparent material. Joining the platelet to the upper bucket, as well as the joining of other joined components, is preferably effected through an adhesive, normally a hot melt adhesive.

Provided last is a ramp 90. The ramp is fabricated of a rigid material. The ramp has an upper end 92. The upper end is removably coupled to the upper bucket at the lower opening. In this manner animals are allowed to enter the upper bucket.

In operation and use, the system is placed on a floor or other horizontal surface. The ramp is attached to the lower opening of the upper bucket for allowing mice and other animals to be captured, retained and destroyed. Upon entering the upper bucket, an animal will walk onto the horizontal plate adjacent to the lower opening. The plate will not pivot due to the fixed platelet below the plate and the animal. Upon walking on the plate to a location remote from the lower opening, as while reaching for the food at the upper opening, the plate will pivot since there is no platelet below the animal. With the plate pivoting, the animal will fall into the lower bucket. Thereafter the plate will return to the horizontal orientation and the animal is trapped. The transparency in the upper opening provides an apparent opening for animals to lure them over the interior half of the pivotable plate to ensure their capture.

The upper bucket is adapted to be positioned into a hole in the lid of a large bucket. In addition, the lower bucket is adapted to be filled with water to accelerate the killing of the trapped animals.

In order to remove the mice and the other animals from the lower bucket and the system, the user simply removes the transparent sheet from the upper opening and then turns the system upside down. The mice and other animals are the effectively poured out of the system where after the system is re-deployed for further capturing, retaining and destroying.

It should be understood that the upper bucket is adapted to be coupled to any of a variety of lower containers. For example, the upper bucket is adapted to be coupled to a larger trash can of the type which is lifted and inverted by a municipal trash handling truck. User involvement is thus eliminated except for proper position of the upper bucket and lower container and the removal of the transparent sheet.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A better mouse trap system for capturing, retaining and destroying mice and other undesirable animals and for releasing desirable animals, the system comprising, in combination:

a lower bucket having a closed bottom in a circular configuration and an open top in a circular configuration, the bottom and the top being separated by a height, a frusto-conical side wall between the top and the bottom, the bottom being smaller than the top, the side wall terminating above in a cylindrical lip, the lower bucket being essentially rigid and fabricated of a plastic material;

an upper bucket having a closed top in a circular configuration and an open bottom in a circular configuration, the bottom and the top being separated by a height, a frusto-conical side wall between the top and the bottom, the top being smaller than the bottom, the side wall terminating below in a cylindrical lip, the upper bucket being essentially rigid and fabricated of a plastic material, the upper bucket having a front with an arcuate cut-out extending upwardly from the bottom, vertical slots extending upwardly from the cut-out, the cut-out and slots facilitating the releasably coupling of the upper bucket onto the lower bucket;

an upper opening cut into an upper extent of the side wall of the upper bucket, the upper opening having a horizontal upper slit extending circumferentially for substantially 120 degrees, plus or minus 10 percent, of the side wall diametrically opposed to the arcuate cut-out, the upper opening having an arcuate upper slit extending upwardly from the upper slit to a height of between 15 and 25 percent of the height of the upper bucket, horizontal shelving at the upper slit for supporting bait, a transparent sheet removably coupled to the upper opening;

a lower opening cut into the side wall of the upper bucket, the lower opening having a horizontal lower slit extending circumferentially for substantially 160 degrees, plus or minus 10 percent, at a lower extent of the side wall above the cut-out, the lower opening having an arcuate upper slit extending upwardly from the lower slit to a height of between 20 and 30 percent of the height of the upper bucket;

a flat, generally circular plate with laterally extending pivot pins and a forwardly extending upper magnet, pivot apertures extending through the upper bucket at diametrically opposed locations adjacent to the lower slit, the pivot apertures rotatably receiving the pivot pins for effecting movement of the plate between a horizontal orientation and a pivoted orientation, the horizontal orientation separating a retaining space in the lower bucket from a capturing space in the upper bucket, the pivoted orientation causing an animal on the plate remote from the lower opening to fall into the lower bucket, a lower magnet secured to the upper bucket adjacent to a central extent of the lower slit to receive and retain the upper magnet and plate in the horizontal orientation until an animal is upon the plate remote from the lower opening, the upper bucket having a transverse opening between the lower opening and one of the pivot apertures for adding the plate to and removing the plate from the system;

a semicircular platelet secured to the upper bucket adjacent to the lower slit and beneath half of the plate when in the horizontal orientation, each of the pivot apertures in the side wall of the upper bucket having a lower horizontal face for supporting the plate in the horizontal orientation, each pivot aperture having an arcuate face for allowing the pivoting of the plate, each pivot aperture having a radial face to limit the pivoting of the plate, and one pivot aperture having a vertical finger to preclude an animal within the lower bucket from moving the plate from a horizontal orientation, the plate and platelet being fabricated of a rigid transparent material; and a ramp fabricated of a rigid material, the ramp having an upper end removably coupled to the upper bucket at the lower opening to allow the animals to enter the upper bucket.

* * * * *